United States Patent [19]
Kloft et al.

[11] Patent Number: 4,864,728
[45] Date of Patent: Sep. 12, 1989

[54] BRUSHCUTTER

[75] Inventors: Manfred Kloft, Waiblingen-Hegnach; Gerhard Zerrer, Korb; Helmut Unger, Waiblingen-Neustadt, all of Fed. Rep. of Germany

[73] Assignee: Andreas Stihl, Waiblingen, Fed. Rep. of Germany

[21] Appl. No.: 211,970

[22] Filed: Jun. 27, 1988

[30] Foreign Application Priority Data

Apr. 9, 1988 [DE] Fed. Rep. of Germany ....... 8804699

[51] Int. Cl.$^4$ ...................... A01D 75/18; B26B 29/00
[52] U.S. Cl. ........................................ 30/276; 30/286; 30/347; 56/12.7
[58] Field of Search ........... 30/276, 347, 286, DIG. 5; 56/12.7, 320.1, DIG. 20

[56] References Cited

U.S. PATENT DOCUMENTS

| | | | |
|---|---|---|---|
| 2,523,640 | 9/1950 | Zipf | 56/320.1 |
| 3,759,023 | 9/1973 | Comer | 56/320.1 |
| 4,091,536 | 5/1978 | Bartholomew | 30/276 |
| 4,419,822 | 12/1983 | Harris | 30/276 |
| 4,550,499 | 11/1985 | Ruzicka | 30/276 |
| 4,651,422 | 3/1987 | Everts | 56/12.7 X |

Primary Examiner—Yost Frank T.
Assistant Examiner—Rinaldi Rada
Attorney, Agent, or Firm—Walter Ottesen

[57] ABSTRACT

A brushcutter has a guide wand with a drive head rotatably mounted thereon. A motor rotatably drives the drive head and a cutting head for cutting vegetation is mounted on the drive head and defines a rotational plane. A protective arrangement partially overlaps the cutting tool in the region of the rotational plane and has a downwardly extending wall. A detachable skirt extends from the wall downwardly so as to terminate at an elevation beneath the rotational plane and deflects stones and other hard objects caught by the cutting tool thereby protecting an operator of the brushcutter against injury.

12 Claims, 5 Drawing Sheets

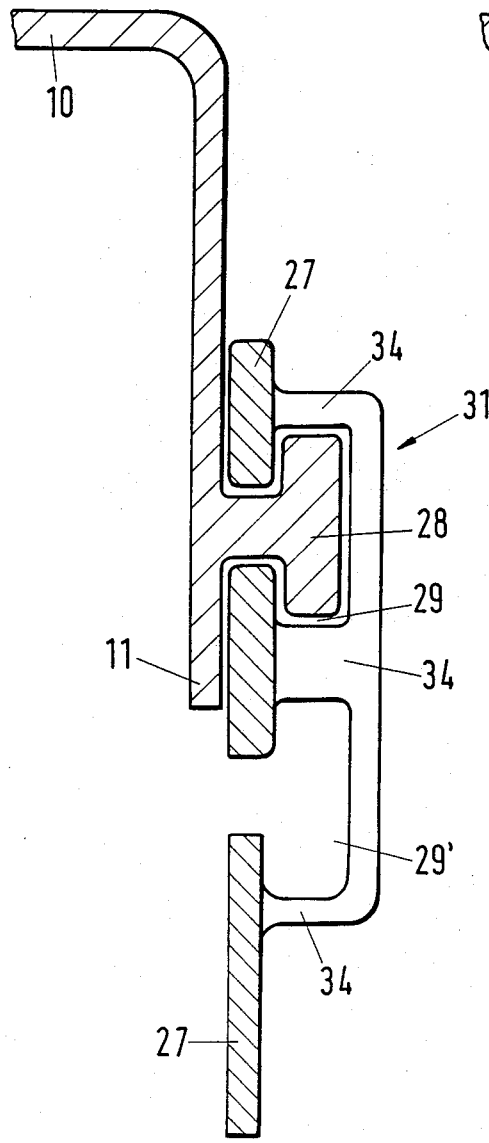
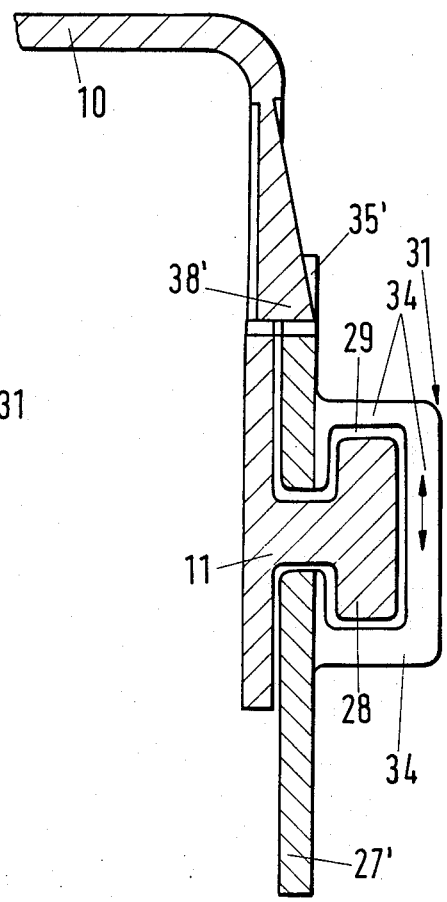

BRUSHCUTTER

FIELD OF THE INVENTION

The invention relates to a brushcutter having a motor-driven drive head which is provided with a cutting tool. A protective arrangement partially covers the cutting tool in the region of its plane of rotation and has a downwardly projecting wall.

BACKGROUND OF THE INVENTION

Brushcutters are preferably used for maintaining gardens and for landscaping generally as well as in forestry and farming. The cutting tool of such a brushcutter is mounted on a drive head which is driven by a lightweight internal combustion engine with the cutting tool rotating in a rotational plane. The cutting tool is configured to accommodate the particular area of application. For cutting grass such as in the region of trees, bushes and the like, a plastic filament is utilized as the cutting tool which is held extended by means of the centrifugal force when the cutter head rotates. Cutting elements in the form of knives are used for heavier vegetation such as brush.

Small stones and wood pieces lying in the cutting area can come into engagement with the cutting element and be projected away by the cutting tool rotating at a high rotational speed which can be dangerous and makes it necessary for the person working with the apparatus to exercise great caution and maintain a required safe distance from others in the area.

The drive head and the rotating cutter tool are usually partially covered with a protective arrangement for preventing accidents. The protective arrangement includes a sector-shaped plate which is approximately parallel to the plane of rotation of the cutting tool. The sector-shaped plate extends at the outer edge into a downwardly extending wall portion which ends beneath the rotational plane of the cutting elements. The use of various cutting tools for the different areas of application places the rotational planes of these tools at different positions because of the way the tools are constructed wherein it is necessary on the one hand that the protective arrangement adequately covers the cutting tool while, on the other hand, it is necessary to bring the cutting tool sufficiently close to the ground area in order to obtain an optimal cutting capacity. To achieve these requirements, the appropriate protective arrangement must likewise be exchanged when changing the cutting tool in the known brushcutters which is very complex and time-consuming.

SUMMARY OF THE INVENTION

It is an object of the invention to provide a brushcutter having a protective arrangement which requires the least effort and yet affords the required protection in combination with an optimal work capacity when utilizing different cutting tools.

The brushcutter according to a preferred embodiment of the invention includes: a guide wand having a lower end; a drive head rotatably mounted on the lower end; a motor mounted on the guide wand for rotatably driving the drive head; an exchangeable cutting tool for cutting vegetation, the cutting tool having an outer tip which traces a circular path as it rotates and being mountable on the drive head and defining a rotational cutting plane at a predetermined distance beneath the lower end which is specific to the cutting too; a protective arrangement having a roof plate connected to the lower end and extending outwardly above the cutting plane to define an outer periphery, the roof plate extending outwardly from the lower end to overlap only a segment of the circular path and having a wall portion at the outer periphery that extends downwardly from the roof plate in a direction transverse to the cutting plane; and, a detachable skirt for extending the wall downwardly.

The skirt is releasably mounted on the wall portion of the protective arrangement which projects downwardly and can compensate for differences in elevation of the rotational plane of different cutting tools. The skirt preferably extends approximately over the entire length of the wall portion and, in a preferred embodiment, is provided with a profiled receiving slot formed in the wall surface of the skirt.

In this embodiment, a profiled strip is formed on the wall portion of the protective arrangement having a profile which defines the form-tight counterpiece to the profiled slot of the skirt and which extends over the entire length of the wall portion in an uninterrupted manner or in segments. The skirt is pushed with its profiled slot onto the profile strip of the wall portion for connecting the same thereto. A resilient latching tongue which latches into an opening provided therefor in the skirt secures the latter against an unintentional displacement.

The cover plate of the protective arrangement is configured as a sector of a circle and the skirt is provided with a plurality of cutouts arranged in spaced relationship to one another for adapting to the radius of the cover plate and for adapting to other protective arrangements manufactured with deviating radii. The cutouts extend in a direction perpendicular to the profiled slot in the region of the wall defining the latter and extend across the width of the slot. These cutouts are provided approximately along the entire length of the profiled slot. The skirt is easily deformable and can be adapted to the different radii of various protective arrangements because of the plurality of cutouts. The skirt can be slipped onto the particular profiled strip of the wall portion of the protective arrangement without difficulty and can again be removed. The width of the skirt and therewith the extension of the skirt portion facing toward the ground as well as an overlapping of the plane of rotation of the cutting tool are obtained without special effort.

The skirt can also be provided with a plurality of profiled slots extending parallel to one another so that by selecting the profiled slot required for the particular elevation, only a single skirt covers the rotational plane of all work tools which can be mounted on the drive head of the brushcutter. The cutouts which make possible the elastic deformation for adaption to the different radii of the protective arrangement are provided on both profiled slots. Since the edge of the skirt facing the ground is subjected to wear, the releasable attachment affords the advantage that a damaged or worn skirt can be quickly exchanged at low cost. It is also possible to insert an additional skirt in the lower profiled slot in order to extend that skirt downwardly which is attached in the upper slot.

BRIEF DESCRIPTION OF THE DRAWINGS

The invention will now be described with reference to the drawings wherein:

FIG. 4 is a partial section view of the protective arrangement taken along line IV—IV of FIG. 3 with the skirt hanging downwardly;

FIG. 5 is also a partial section view corresponding to that shown in FIG. 4 and shows the protective arrangement with the skirt having another configuration; and, FIG. 6 shows a segment of the skirt of FIG. 5.

DESCRIPTION OF THE PREFERRED EMBODIMENTS OF THE INVENTION

Figure 1:
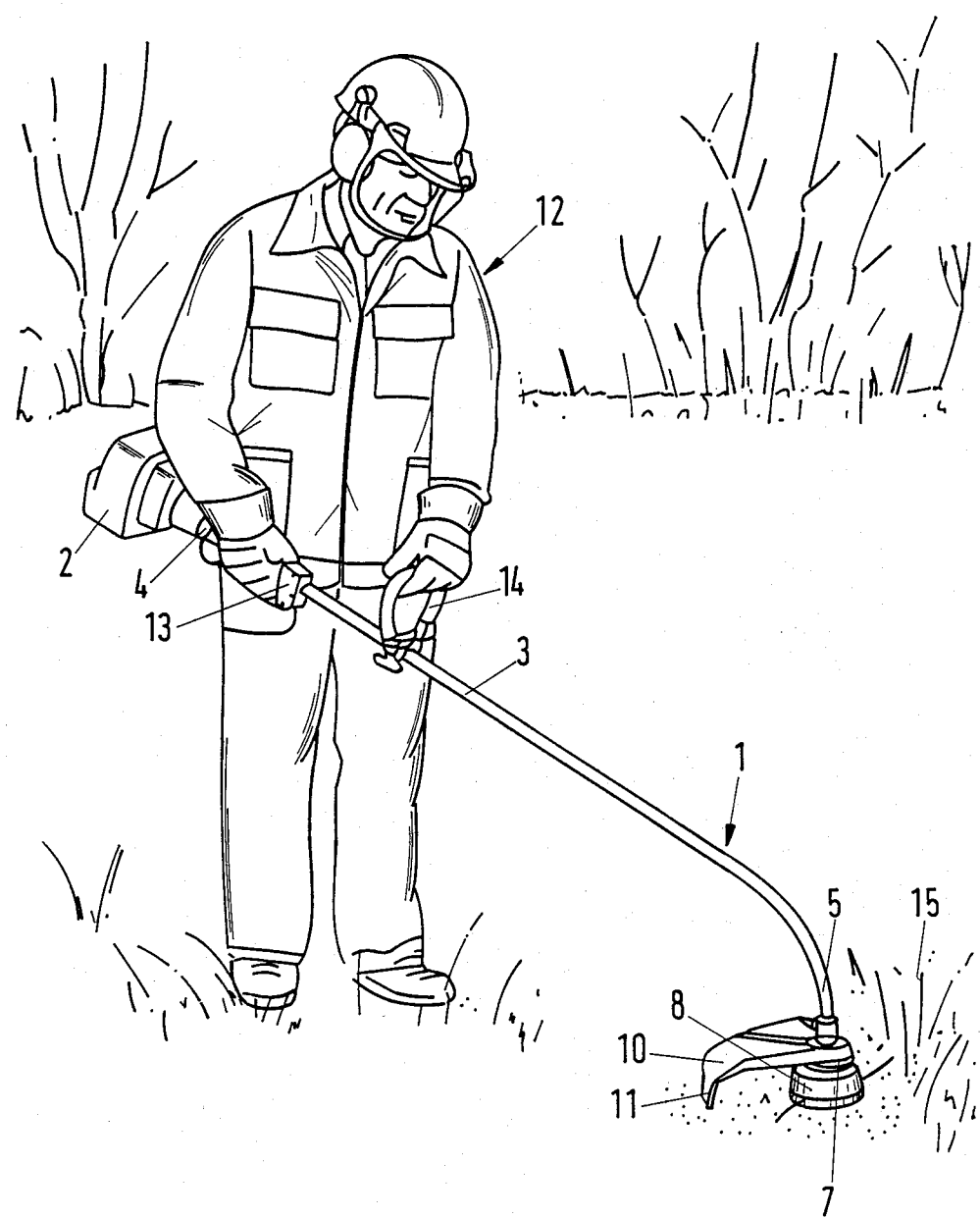
FIG. 1 is a schematic perspective view showing an operator working with the brushcutter according to the invention.

FIG. 1 shows the brushcutter 1 held by an operator 12. The brushcutter is provided with a drive motor 2 mounted at the upper end 4 of a guide wand 3. A drive head 7 is journalled at the lower end 5 of the guide wand 3 and is set in rotational motion by the motor 2. The drive head includes a cutting tool 8 mounted thereon which has two cutting elements. The cutting tool 8 is partially covered by a protective arrangement 10 which has a circular sector-shaped cover plate having wall portion 11 directed downwardly and approximately perpendicular to the plane of the plate. The protective arrangement overlaps the rotational plane of the cutting element of the rotating cutting tool 8.

The brushcutter is held by the operator 12 with a guide-wand handle 13 and a bail handle 14 and is moved with laterally directed pivotal movements through the brush 15 to be cut with the drive head 7 and cutting tool 8 being held closely above the ground (FIG. 1). When working with the apparatus, an appropriate work tool is used which is adapted to the vegetation which is to be cut.

Figure 2:
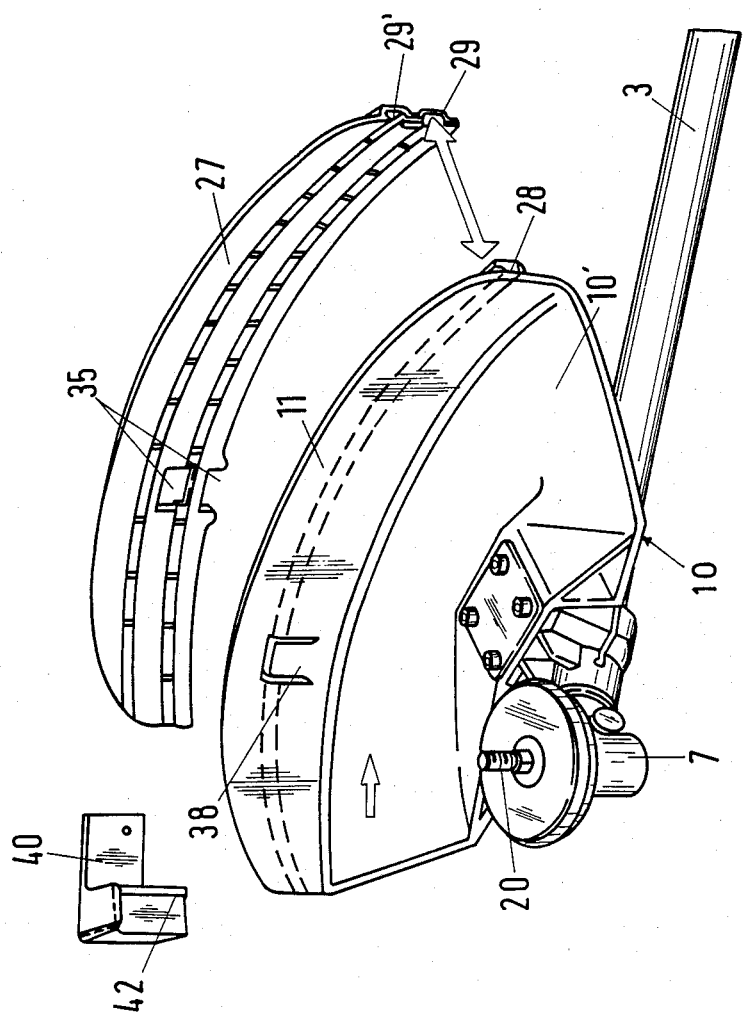
FIG. 2 is a perspective view of the brushcutter viewed from below with the cutting tool removed and showing the inside wall surface of the protective arrangement and the skirt which is to be mounted thereon.
Figure 3:
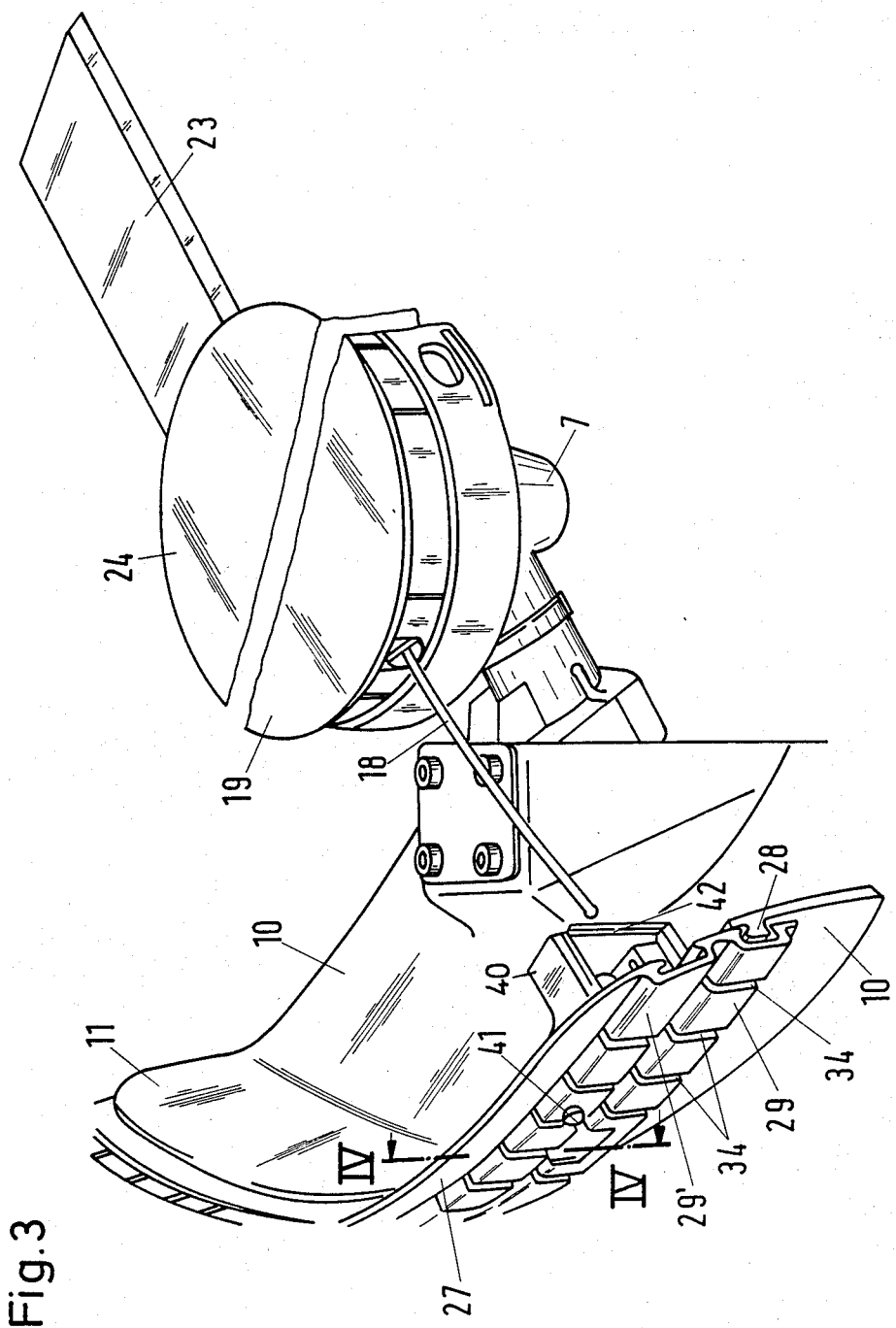
FIG. 3 is a perspective view of the cutting tool from below in two different embodiments having different cutting elements; this view also shows the protective arrangement mounted on the drive head and is likewise viewed from below to show a partial inner view with the skirt attached.

FIG. 3 is a partial view from below showing a cutting tool 19, that is, a view into the inside of the protective arrangement 10 which is turned upside down. The cutting tool 19 shown in FIG. 3 is suitable for cutting grass and has two plastic filaments 18 which serve as cutting elements of which only one is shown. A differently configured cutting tool 24 is shown in FIG. 3 as an alternative and is likewise illustrated as a partial view. The alternative embodiment is fitted with knives 23 for cutting brush. The cutting tool needed in a particular instance is threadably fastened to a drive lug 20 of the drive head 7 (FIG. 2). The drive lug 20 is shown in FIG. 2 in connection with a protective arrangement 10 which is facing upwardly to show the inner wall surface thereof. Thus, in FIG. 2, the protective arrangement 10 is shown facing upwardly whereas during operation, it faces downwardly as shown in FIG. 1.

The protective arrangement 10 including a roof plate 10' is so mounted that it covers the cutting tool in the direction toward the operator 12 so that hard objects such as stones can be caught in the event that they are struck and accelerated away by the rotating cutting elements.

A skirt 27 which is easily removable and again remountable is mounted on the wall portion 11 of the protective arrangement 10 to adapt the protective arrangement to different cutting tools having planes of rotation which lie at different elevations in relationship to the drive head 7. The skirt 27 extends approximately over the entire length of the wall portion 11. The wall portion 11 is provided with a first holding means in the form of a profiled strip 28 over its entire length or in individual segments for easily mounting and demounting the skirt 27. The skirt 27 has a corresponding profiled slot which is formed by an elongated recess in the skirt wall and defines a second holding means which engages the profile strip 28 (FIG. 3). For establishing the connection with the wall portion 11, the skirt is pushed into place with its profiled slot 29 on the profile strip 28 as indicated by the double arrow in FIG. 2.

Figure 6:
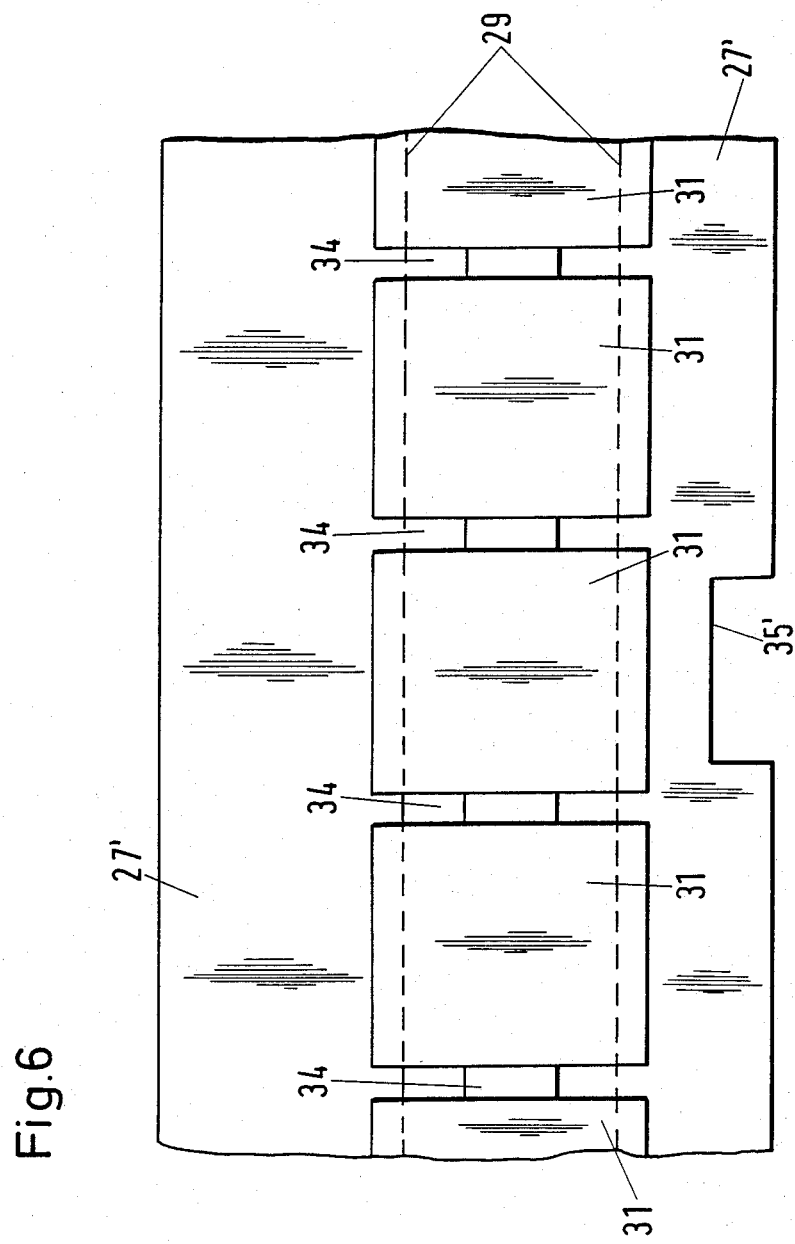

Cutouts 34 are provided in the wall 31 of the profiled slot 29 to ensure adequate elasticity of the skirt wall for placement on the profile strip 28 and to adapt the skirt to the circularly-shaped contour of the wall portion 11. The cutouts 34 are mounted so that they are distributed over the length of the profiled slot as shown in FIGS. 3 and 6.

The cutouts 34 are exemplary of bending means formed in the skirt to impart the above-mentioned elasticity thereto. In this way, the skirt 27 is bendable so that it can be quickly and simply exchanged as soon as this is required as a consequence of an exchange of a cutting tool or because of damage or wear of the skirt itself. The skirt 27 is provided with a latch cutout 35 for mounting to the wall portion 11 and in which a resilient latching tongue 38 of the perpendicular wall portion 11 of the protective arrangement 10 latches as shown in FIG. 2.

The skirt 27 of FIGS. 2 to 4 has a profiled slot 29' parallel to the slot 29 so that it can be utilized for cutting tools having rotational planes which are very different in elevation.

In the embodiment of FIG. 5, the skirt 27' is provided with only one profiled slot 29 and is therefore less expensive to manufacture. In this skirt, a receiving opening 35' is likewise provided for a latching tongue 38' of the wall portion 11. The latching tongue 38' and the receiving opening 35' conjointly define ancillary holding means at the interface of the skirt 27 and the wall portion 11 for securing the skirt 27 to the wall portion 11.

A knife bracket 40 can be mounted on the inner side of the skirt 27 facing toward the cutting tool as shown in FIGS. 2 and 3. A knife blade 42 is attached to the bracket 40 which is provided when plastic filaments 18 are utilized as cutting elements in order to automatically shorten the filament ends after a length adjustment as soon as the cutting tool is set into rotational motion. The knife bracket 40 is attached to the skirt 27 with a screw 41. The spacing of the bracket to the rotational plane of the cutting tool is adjustable. Furthermore, the bracket 40 can be inverted so that the position of the cutting edge is adapted to the direction of rotation of the cutting tool 19. The knife bracket 40 can be mounted on the inner wall surface of the skirt 27 so as to be displaceable to change the spacing thereof relative to the filament of a filament head.

It is understood that the foregoing description is that of the preferred embodiments of the invention and that various changes and modifications may be made thereto without departing from the spirit and scope of the invention as defined in the appended claims.

What is claimed is:

1. A handheld portable brushcutter for use by an operator for cutting vegetation comprising:

a guide wand manipulated by the operator during cutting operations and having a lower end;

a drive head rotatably mounted on said lower end;

a motor mounted on said guide wand for rotatably driving said drive head;

an exchangeable cutting tool for cutting the vegetation, said cutting tool having an outer tip which traces a circular path as it rotates and being mountable on said drive head and defining a rotational cutting plane at a predetermined distance beneath said lower end which is specific to said cutting tool;

a protective arrangement having a roof plate connected to said lower end and extending outwardly above said cutting plane to define an outer periphery, said roof plate extending outwardly from said lower end to overlap only a segment of said circular path and having a wall portion at said outer periphery that extends downwardly from said roof plate in a direction transverse to said cutting plane;

an exchangeable skirt surrounding said cutting tool in spaced relationship to said segment of said circular path and being selected to accommodate said cutting tool by extending downwardly from said wall portion to an elevation beneath said cutting plane whereby stones or other objects caught by said cutting tool will be deflected by said skirt to prevent injury to the operator;

said skirt and said wall portion conjointly defining a common interface extending over a portion of said skirt;

attachment means formed at said interface for releasably attaching said skirt to said wall portion; and, bending means formed in said skirt to impart sufficient elasticity thereto to facilitate the engagement and disengagement of said skirt via said attachment means at said interface.

2. The brushcutter of claim 1, said attachment means comprising first holding means formed on said wall portion; and, second holding means formed on said skirt for releasably engaging said first holding means for releasably attaching said skirt to said wall portion.

3. The brushcutter of claim 2, said second holding means comprising a recess formed in said skirt so as to define a slot; and, said first holding means comprising an elongated protrusion formed on said wall portion for releasably engaging said slot.

4. The brushcutter of claim 3, said elongated protrusion and said slot being configured so as to permit the latter to be pushed upon said elongated protrusion to surroundingly engage and tightly hold the same.

5. The brushcutter of claim 4, comprising ancillary holding means at the interface of said skirt and said wall portion for securing said skirt to said wall portion.

6. The brushcutter of claim 5, said ancillary holding means comprising; a resilient latching tongue formed in said wall portion; and, said skirt having a latching opening for receiving said latching tongue in latching engagement therein to secure said skirt to said wall portion.

7. The brushcutter of claim 3, said bending means comprising a plurality of cutouts formed in said skirt so as to extend transversely at least through said recess.

8. The brushcutter of claim 7, said cutouts being distributed over approximately the entire length of said recess.

9. The brushcutter of claim 7, said recess having a base wall at the bottom thereof and said cutouts being formed in said base wall.

10. The brushcutter of claim 1, said cutting tool being a filament head for supplying filament for cutting the vegetation; said skirt having an inner wall surface facing said filament head; and, said brushcutter further comprising knife means mounted on said inner wall surface for shortening the filament supplied by said filament head.

11. The brushcutter of claim 10, said knife means comprising: a knife bracket mounted on said inner wall surface; and, a knife blade held in said bracket.

12. The brushcutter of claim 11, said filament head being rotatable by said drive head in a predetermined direction, said knife bracket being mounted on said skirt so as to accommodate said direction.

* * * * *